United States Patent [19]

Yonemura et al.

[11] 4,215,168
[45] Jul. 29, 1980

[54] LAMINATED MULTILAYER SHEET STRUCTURE AND ITS UTILIZATION

[75] Inventors: Utami Yonemura, Hino; Kiyoshi Chiba, Niiza; Kunio Itoh; Yuji Mitani, both of Hino; Shigenobu Sobajima, Hachioji, all of Japan

[73] Assignee: Teijin Limited, Osaka, Japan

[21] Appl. No.: 919,697

[22] Filed: Jun. 27, 1978

[30] Foreign Application Priority Data

Jun. 30, 1977 [JP] Japan .................................. 52-77196

[51] Int. Cl.² .......................... B32B 7/02; B32B 15/04
[52] U.S. Cl. ...................................... 428/215; 427/89; 427/202; 427/402; 428/469; 428/472; 428/913
[58] Field of Search ............... 428/215, 470, 472, 469, 428/913; 427/66, 109, 402, 89, 202

[56] References Cited

U.S. PATENT DOCUMENTS

| | | | |
|---|---|---|---|
| 3,080,266 | 3/1963 | Haslam | 428/470 |
| 3,698,946 | 10/1972 | Kaspaul | 428/472 |
| 3,962,488 | 6/1976 | Gillery | 427/109 |
| 4,017,661 | 4/1977 | Gillery | 428/472 |
| 4,020,389 | 4/1977 | Dickson | 427/66 |

FOREIGN PATENT DOCUMENTS

840513 4/1970 Canada .

Primary Examiner—Thomas J. Herbert, Jr.
Attorney, Agent, or Firm—Wenderoth, Lind & Ponack

[57] ABSTRACT

A laminated multilayer sheet structure composed of (A) an opaque flexible sheet layer and (B) a flexible layer laminated to the surface of layer (A) and composed of a transparent thermic ray reflecting layer ($B_1$) bonded to a transparent synthetic resin layer ($B_2$). The sheet structure may be applied to the surface of a floor, wall, ceiling, partition or piece of furniture for indoor heat insulation.

12 Claims, No Drawings

LAMINATED MULTILAYER SHEET STRUCTURE AND ITS UTILIZATION

This invention relates to a laminated multilayer sheet structure useful as an interior finishing or decorating material which is to be applied to indoor surfaces such as floors, walls, ceilings, partitions and furniture to inhibit the dissipation of heat to the outdoors, give a feeling of warmth to the inhabitants, shield electromagnetic waves which may cause troubles to television and radio receiver sets and the like, and to impart an aesthetic beauty.

More specifically, this invention relates to a laminated multilayer sheet structure composed of (A) an opaque flexible sheet layer and (B) a flexible layer laminated to the surface of the layer (A) and composed of ($B_1$) a transparent thermic ray reflecting layer bonded to ($B_2$) a transparent synthetic resin film layer; and to a method for heat insulation of a room by utilizing the sheet structure.

Interior decorating materials such as wallpapers which are in the form of paper, cloth or non-woven cloth made of fibrous materials such as natural and/or synthetic fibers have heretofore been used on indoor surfaces such as walls and partitions. There has been no idea, however, of imparting to such a relatively thin sheet structure a satisfactory action of heat insulation and an action of positively reflecting thermic rays or radiant heat while retaining its aesthetic beauty and the feeling of comfort it provides as an interior material.

A flexible sheet consisting essentially of a transparent thermic bonded to a transparent synthetic resin film layer is known (for example, see U.S. copending application Ser. No. 889,450, filed Mar. 23, 1978, of the same coinventors as the present application). Various metals or metal compounds forming the transparent thermic ray reflecting thin layer and various methods of forming such a layer are also known.

No attempt has been known to provide a laminated multilayer sheet structure which can be used as a unique and excellent interior material by combining such a sheet with the aforesaid interior material.

The present inventors have made investigations in order to provide a laminated multilayer sheet structure which has a satisfactory action of heat insulation and an action of positively reflecting thermic rays or radiant heat, and which provides an aesthetic beauty and a feeling of comfort, and an effect of shielding electromagnetic waves, and which has satisfactory light weight, applicability, durability and decoratability.

These investigations led to the discovery that a laminated multilayer sheet structure composed of (A) an opaque flexible sheet layer and (B) a flexible layer laminated to the layer (A) and composed of ($B_1$) a transparent thermic ray reflecting layer bonded to ($B_2$) a transparent synthetic resin film layer, has the aforesaid properties and is suitable for use as an interior material.

It has also been found that a method for heatinsulating a room can be provided which comprises applying the aforesaid sheet structure to the surface of a floor, wall, ceiling, partition, furniture, etc. with the layer (A) side being in contact with the surface, by an adhesive for example. This method has been found to provide an action of positively reflecting thermic rays or radiant heat, an effect of shielding electromagnetic waves, or aesthetic beauty, and a feeling of comfort. It has also been found that this invention can obviate a feeling of discomfort caused by cold radiation in the wintertime and heat radiation in the summertime from the wall surface, ceiling, etc. of a room, and thus markedly increase the comfort of the room.

Another discovery is that since the opaque flexible sheet layer (A) can be provided with a decorative effect by colors, figures and design patterns and these decorative designs can be seen through the transparent flexible layer (B), the decoration provides a solid feeling. Furthermore, it has been found that without particularly applying a color, figure or design pattern to the sheet layer (A), the knitted pattern, woven pattern, watermark, etc. of the sheet layer (A) itself can be utilized for decorative purposes.

It is an object of this invention therefore to provide a new laminated multilayer sheet structure suitable for use as an interior material for example, which has the aforesaid unique and superior effects.

Another object of this invention is to provide a method for insulating a room from outdoor heat by using the aforesaid sheet structure.

The above and other objects and advantages of the invention will become more apparent from the following description.

The laminated multilayer sheet structure of the invention composed of (A) an opaque flexible sheet layer and (B) a flexible layer laminated to the surface of the layer (A) and composed of ($B_1$) a transparent thermic ray reflecting layer bonded to ($B_2$) a transparent synthetic resin film layer, can be prepared, for example, by the following methods (i) and (ii).

(i) A method which comprises forming the transparent synthetic resin film layer ($B_2$) on one surface of the opaque flexible sheet layer (A) by pasting, coating, melt-adhering or any other desired laminating means, and then bonding the transparent thermic ray reflecting layer ($B_1$) to the layer ($B_2$) by any desired means to be described hereinbelow.

(ii) A method which comprises bonding the transparent thermic ray reflecting layer ($B_1$) to one surface of the transparent synthetic resin film layer ($B_2$) by any desired means to be described hereinbelow, and then bonding one surface of the opaque flexible sheet layer (A) to the layer ($B_2$) or layer ($B_1$), preferably the former, by such a means as pasting.

In commercial practice, the method (II) is preferred.

The opaque flexible sheet layer (A) used in the laminated multilayer sheet structure of the invention is in the form of, for example, paper, non-woven fabric, knitted fabric, woven fabric or the like prepared from various natural or synthetic fibrous materials. It may contain decorative designs such as colors, letters, figures and patterns at least on that surface which is in contact with the layer (B). These decorative designs can be applied by any desired means such as printing, stencilling, dyeing, pasting and heat drawing.

The sheet layer (A) may contain a colored or uncolored transparent film layer. Thus, the layer (A) should be opaque as a whole, but need not to be opaque over its entire thickness.

The surface of the layer (A) which is opposite the surface on which the layer (B) is formed may include an adhesive layer applied in advance. The adhesive layer may be covered with a protective covering sheet which is adapted to be peeled off at the time of adhering the sheet structure of the invention to a wall, ceiling, partition, etc.

The transparent synthetic resin film layer (B$_2$) is a film layer of various synthetic resins, for example, thermoplastic resins such as polyethylene terephthalate, polyethylene naphthalate, polycarbonate, acrylic resins, polystyrene, polyethylene, polypropylene, polyamides and fluorocarbon resins; and solvent-soluble resins such as polyvinyl alcohol, polyacrylonitrile, polyurethane, aromatic polyamides, and polyimides. These synthetic resins may be in the form of a homopolymer, a copolymer, or a mixture of two or more resins.

The thickness of the layer (B$_2$) can be selected as desired, but is preferably about 2 μm to about 3 mm, more preferably about 20 μm to about 200 μm. The layer (B$_2$) may be colored to a hue and a depth which do not cause a loss of transparency, or may be subjected to matte finish or corona discharge to such an extent as will not cause a loss of transparency.

The suitable degree of transparency of the layer (B$_2$) is such that it has a transmittance of visible light having a wavelength of 550 nm of at least about 60%, preferably at least about 80%.

In the laminated multilayer sheet structure of this invention, the transparent thermic ray reflecting layer (B$_1$) is a selectively transparent layer which is transparent to visible light and can reflect infrared rays (thermic rays).

Metals or metal compounds used for forming such a layer (B$_1$) are known, and can be utilized in this invention, too. There are two embodiments of such a layer (B$_1$). Embodiment (1) is a transparent semiconductor layer of a compound selected from indium oxide, tin oxide, cadmium oxide, antimony oxide, copper iodide, and mixtures of at least two of these compounds. Embodiment (2) is a transparent composite layer consisting of a thin layer of a metal selected from the group consisting of gold, silver, copper, aluminum and mixtures or alloys of at least two of these metals, preferably silver or an alloy of silver and copper, and a thin layer of a metal compound having a high refractive index selected from the group consisting of titanium oxide, bismuth oxide, zirconium oxide, silicon oxide, zinc sulfide, zinc oxide, tin oxide and indium oxide. If desired, the embodiment (2) may be a three-layer structure consisting of a high refractive layer-metal layer-high refractive layer.

The transparent semiconductive layer of embodiment (1) has a thickness of preferably about 500 to about 5,000 Å, more preferably about 1,000 to about 3,000 Å. When the thickness of the layer is less than 500 Å, the effect of shielding electromagnetic waves and reflecting thermic rays is not sufficient. On the other hand, when it is larger than 5,000 Å, the resulting sheet structure is economically disadvantageous, and its visible light transmission tends to decrease.

The thickness of the transparent composite layer according to embodiment (2) is such that the thickness of the thin metal layer is preferably about 50 to about 600 Å, more preferably about 100 to about 300 Å, and the thickness of the high refractive substance layer is preferably about 50 to about 600 Å, more preferably about 120 to about 400 Å.

In order for the transparent composite thin layer in accordance with embodiment (2) to have the ability to reflect infrared rays (or electric conductivity), it should have some extent of continuity instead of having a discontinuous island structure. Thicknesses of at least about 50 Å are required for the discontinuous island structure to become a continuous structure. From the standpoint of transparency, the thickness is preferably not more than 600 Å.

When the thickness of the thin metal layer is smaller, the light transmitting wavelength area becomes wider. Accordingly, the suitable thickness of the metal layer is up to 300 Å so as to increase transparency. To impart sufficient ability to reflect infrared rays (or electric conductivity), the thickness of the metal layer is preferably at least 100 Å.

In the production of the laminated multilayer sheet structure of the present invention, the transparent thermic ray reflecting layer (B$_1$) can be formed by utilizing known means.

The transparent semiconductor thin layer in accordance with embodiment (1) can be formed, for example, by such known means as vacuum deposition, cathode sputtering, plasma spraying, vapor phase plating, electroless plating, electroplating, and coating, either alone or in combination.

In embodiment (2), the thin metal layer can be formed, for example, by vacuum deposition, cathode sputtering, plasma spraying, vapor phase plating, electroless plating, electroplating, and coating, either alone or in combination. The vacuum deposition technique is especially preferred for commercial operations. In embodiment (2), the transparent high refractive substance layer can be formed, for example, by sputtering, ion plating, vacuum deposition or coating.

The transparent high refractive thin layer which constitutes the composite thin layer of embodiment (2) has a refractive index of at least 1.6, preferably at least 1.8, with respect to visible light having a wavelength of 550 nm. The transmittance of the aforesaid visible light is preferably at least about 80%, more preferably at least about 90%. The degree of transparency of the transparent thermic ray reflecting layer (B$_1$) in accordance with both the embodiments (1) and (2) is such that the transmittance of visible light having a wavelength of 550 nm is preferably at least about 20%, more preferably at least about 50%.

Advantageously, in the production of the sheet structure of this invention having the layer (B$_1$) in accordance with embodiment (2), the transparent high refractive substance layer is formed by coating from a solution of an organic metal compound in a solvent, and it is preferred to include a small amount of an organic residual moiety in the high refractive layer.

The use of titanium oxide as the metal compound for forming the high refractive layer is especially preferred. A suitable high refractive layer, is a thin layer formed by the methods described hereinabove, of an oxide of titanium derived from a layer of an organic titanium compound and containing an organic residual moiety of the organic titanium compound.

The layer (B) having layer (B$_1$) in accordance with embodiment (2) which contains such a transparent high refractive substance layer, and its production, are described in detail in U.S. copending prior application Ser. No. 889,450 referred to above.

It is preferred to use layer (B) disclosed in this prior application which consists essentially of (B$_2$) a transparent synthetic resin film layer, and (B$_1$) a transparent thermic ray reflecting layer comprising (b$_1$) a layer, in contact with the layer (B$_2$), of an oxide of titanium derived from a layer of an organic titanium compound and containing an organic residual moiety of the organic titanium compound, (b$_1$)' a thin layer of an electrically conductive metal in contact with layer (b₁), (b₁)" a thin layer of an oxide of titanium in contact with layer (b₁)', and, optionally, (b₁)''' a transparent top layer in contact with layer (b₁)".

The preferred layer (B) can be prepared by the method which comprises the following steps (1) to (5):

(1) a step of coating the surface of layer (B₂) with a solution of an organic titanium compound in a solvent, (2) a step of drying the resulting coating under such conditions which will induce hydrolysis of the organic titanium compound in the coating but leave part of an organic moiety of the organic titanium compound (for example, at a temperature of about 50° C. to about 200° C.), (3) a step of forming a thin layer (b₁)' of an electrically conductive metal on the dried layer (b₁) of the oxide of titanium containing the organic residual moiety which is formed in step (2), (4) a step of forming a layer (b₁)" of an oxide of titanium on the thin conductive metal layer (b₁)' formed in step (3), and (5) a step of optionally forming the transparent top layer (b₁)''' on the layer (b₁)" formed in step (4).

Preferred organic titanium compounds used to form the layer (b₁) are alkyl titanates of the following formula $$Ti_l O_m R_n$$

wherein R represents an alkyl group, preferably a $C_1$–$C_{20}$ alkyl group and more preferably $C_2$–$C_{11}$ alkyl group, and l, m and n are positive members.

Alkyl titanates of the above formula wherein $$m = 4 + (l-1) \times 3,$$

$$n = 4 + (l-1) \times 2, \text{ and}$$

$$l = 1 - 30$$

are especially preferred for their good coating processability. The number l need not be a single value but may have a distribution. Alkyl titanates with a distribution of l values having a maximum value of 15 or less are preferred with regard to their hydrolyzability and the viscosity of their coating solution. The use of alkyl titanates represented by the above formula wherein R is a $C_2$–$C_{11}$ alkyl group is preferred because of the simplicity of film-forming operation typified by the ease of coating and satisfactory rates of hydrolysis, and good mechanical characteristics and transparency of the resulting coating. These alkyl titanates may be used as mixtures of two or more.

The alkyl titanate is dissolved in an organic solvent, coated on the surface of layer (B₂), and hydrolyzed in the presence of atmospheric moisture. Subsequent condensation reaction results in the removal of an alkyl hydroxide and affords a network structure. By choosing coating conditions, the alkyl titanate is converted to a form approximating titanium oxide.

The layer (b₁) of an oxide of titanium derived from a layer of an organic titanium compound and containing an organic residual moiety of the organic titanium compound preferably contains at least 50% by weight of titanium oxide in order that it may exhibit the effects intended by the present invention. To ensure stability for long periods of time, it is especially preferred that the layer (b₁) should contain at least 75% by weight of titanium oxide. In order that the sheet structure of the invention may exhibit the desired effect by the presence of organic ingredients, the amount of the organic ingredient is preferably at least 0.1% by weight, more preferably at least 0.5% by weight.

Examples of the alkyl titanates of the above formula are tetrabutyl titanate, tetraethyl titanate, tetrapropyl titanate, tetrastearyl titanate, tetra-2-ethylhexyl titanate, and diisopropoxytitanium-bis-acetylacetate. Of these, tetrabutyl titanate and tetrapropyl titanate are preferred. These alkyl titanates can be used as such, and precondensates of these, such as their dimers, tetramers or decamers, can also be used.

The organic solvent generally used to coat the alkyl titanate preferably can dissolve the alkyl titanate completely, has an affinity for the surface of layer (B₂), and permits easy coating and drying. It includes hydrocarbons, alcohols, phenols, ethers, ketones, esters, carboxylic acids and halogenated hydrocarbons. Specific examples are hexane, cyclohexane, heptane, octane, methylcyclohexane, toluene, benzene, xylene, octene, nonene, solvent naphtha, methanol, ethanol, isopropanol, butanol, pentanol, cyclohexanol, methylcyclohexanol, phenol, cresol, ethyl ether, propyl ether, tetrahydrofuran, dioxane, acetone, cyclohexanone, methyl ethyl ketone, methyl isobutyl ketone, methyl acetate, ethyl acetate, propyl acetate, butyl acetate, ethyl propionate, methyl benzoate, glacial acetic acid, chloroform, carbon tetrachloride, trichloroethylene, trichloroethane, chlorobenzene, dibromoethane, methyl Cellosolve, Cellosolve, and Cellosolve acetate. Of these, isopropanol, butanol, n-hexane, and toluene are preferred. These organic solvents can be used singly, or if required, as mixtures.

A coating solution for forming the thin layer (b₁) can be easily prepared by dissolving the organic titanium compound in the organic solvent. If desired, to promote dissolving, the mixture may be heated to such an extent as not to hamper the purpose of this invention of leaving a part of the organic residual moiety. Or some amounts of resin ingredients soluble in the organic solvent may be added in order to improve the characteristics of the coating, such as adhesion, refractive index, color and hardness, in amounts which will not hamper the purpose of leaving a part of the organic residual moiety. The resin ingredient is, for example, a silicon-containing resin, an acrylic resin, an epoxy resin, or a urethane resin which are soluble in the solvent. The concentration of the resin ingredient in the organic solvent solution of the alkyl titanate can be changed as desired. To obtain a uniform thin layer having a thickness of several hundred Angstroms, the concentration is 0.1 to 30% by weight, preferably 0.5 to 10% by weight, more preferably 1 to 7.5% by weight.

Any desired known means can be used to coat the solution of the organic titanium compound on a substrate layer of film-forming synthetic resin. Examples of the known coating means are dip coating, spray coating, spinner coating, and coating methods using general coating machines such as a gravure coater, a Meyer bar coater or a reverse roll coater. The use of a gravure coater or Meyer bar coater is preferred from the viewpoint of control and uniformity of coating thickness. The spray coating process can also be used preferably. Simultaneously with or after the coating, the coating is dried at a temperature above room temperature, for example at about 50° to 200° C., for 10 seconds to 10 hours to remove the solvent.

By adjusting the content of the organic residual moiety of the organic titanium compound in layer ($b_1$) preferably to 0.1 to 30% by weight, more preferably to 0.5 to 10% by weight, the adhesion of the thin layer ($b_1$) to the thin metal layer ($b_1$)' or to the layer ($B_2$) increases, and a selectively transparent coating (transparent conductive film) can be obtained which has transparency over a wide wavelength range and superior surface conductivity.

Because of the presence of the organic residual moiety, the layer ($b_1$) has a lower refractive index than a titanium oxide layer obtained by sputtering or vacuum deposition, and it is about 1.6 to 2.2 in a visible light region. In addition, the layer ($b_1$) contains some amount of metal diffused from the thin metal layer ($b_1$)'. For this reason, the preferred layer ($B_1$) described hereinabove has various advantages among which are:

(a) Its light transmittance is uniform over a wide area.
(b) Its adhesion to layer ($B_2$) is superior.
(c) Its surface conductivity is superior.

The thin metal layer ($b_1$)' and the transparent high refractive thin layer ($b_1$) may be formed in this order on the layer ($B_2$) to form a two-layer transparent thermic ray reflecting layer ($B_1$). Or the transparent high refractive thin layer ($b_1$), the transparent thin metal layer ($b_1$)' and the transparent high refractive thin layer ($b_1$)'' may be formed in this order on the layer ($B_2$) to form a three-layer transparent thermic ray reflecting layer ($B_1$). The three-layered coating is preferred because it has good transparency and the great ability to reflect thermic rays (infrared rays).

The transparent protective layer ($B_3$), corresponding to the previously mentioned optional ($b_1$)''' layer, to be provided on the transparent thermic ray reflecting layer ($B_1$) is an organic or inorganic layer provided mainly for the purpose of increasing mechanical durability. It is formed of, for example, an acrylic resin such as polymethyl methacrylate and a methyl methacrylate copolymer, a copolyester derived, for example, from phthalic acid and ethylene glycol and neopentyl glycol, or a silicon-containing resin. The protective layer may, if desired, be composed of two or more layers. Its thickness is the minimum thickness which is required to obtain durability. It is usually not more than 5 microns, preferably not more than 2 microns. If the thickness of the protective layer exceeds 5 microns, the infrared reflecting ability of the layer ($B_1$) is reduced, and its inherent function is not exhibited.

The laminated sheet structure of the invention described hereinabove has light weight, light-shielding property, acoustically insulating property, water resistance, the ability to shield electromagnetic waves, thermally insulating property, antistatic property, decoratability, the ability to shield gases, and electric conductivity. Thus, it finds extensive applications for preparing walls and other partitions of a room, and also for use in conjunction with panel heaters.

The following examples illustrate the present invention in greater detail. In these examples, the light transmittance was measured at a wavelength of 550 nm, and the infrared reflection, at a wavelength of 10 $\mu$m. All parts and percentages are by weight.

EXAMPLES 1 AND 2 AND COMPARATIVE EXAMPLES 1 and 2

A thin titanium oxide layer having a thickness of 250 Å as a first layer, a thin silver layer having a thickness of 140 Å as a second layer and a thin titanium oxide layer having a thickness of 300 Å as a third layer were successively laminated on a biaxially stretched polyethylene terephthalate film ($B_2$) having a thickness of 75 $\mu$m and a light transmittance of 88% to form a thin composite layer ($B_1$) having transparency, electric conductivity and selective capability of transmitting light.

Each of the titanium oxide layers was prepared by coating a solution consisting of 3 parts of a tetramer of tetrabutyl titanate, 65 parts of isopropanol and 32 parts of n-hexane by a bar coater, and heating the coating at 100° C. for 5 minutes.

The silver layer was formed by vacuum deposition in a vacuum of $5 \times 10^{-5}$ Torr. The first and third titanium oxide layers both contained 5.5% of a butyl group (determined for mass No. 56 by mass fragmentography). The resulting film had a light transmittance of 83%, a surface resistance of 15 ohms/sq, and an infrared ray reflectance of 96%.

By using this film, a laminated multilayer sheet structure of this invention was prepared by procedures (1) and (2) described below.

(1) A wallpaper sheet (A) having a thickness of 100 $\mu$m for use in covering a partition wall in a room was bonded to the ($B_1$) layer surface of the layer (B) by means of an acrylic adhesive to form a laminate sheet (to be referred to as laminate sheet X).

(2) Similarly, a wallpaper sheet (A) was bonded to the opposite surface of the sheet layer (B) to form a laminate sheet (to be referred to as laminate sheet Y).

(3) For comparison, the same polyethylene terephthalate film ($B_2$) having a thickness of 75 $\mu$m was bonded to the same wallpaper sheet (A) to form a laminate sheet (to be referred to as laminate sheet Z).

To compare the heat insulating effects of the laminate sheet structures and the wallpaper (A), their overall coefficients of heat transfer were measured by an "HFM heat transfer meter" (a product of Showa Denko Kabushiki Kaisha). The results are shown in Table 1.

Furthermore, their effects of shielding electromagnetic waves of 13.6 MHz were measured. The results are also shown in Table 1.

Table 1

| Run Sheet | Example 1 Laminate sheet X | Example 2 Laminate sheet Y | Comparative Example 1 Laminate sheet Z | Comparative Example 2 Wallpaper sheet |
|---|---|---|---|---|
| Overall coefficient of heat transfer (kcal/hr. m² . deg) | 3.5 | 2.8 | 4.0 | 8 |
| Effect of shielding electromagnetic waves (dB) | 30 | 30 | 0 | 0 |

EXAMPLE 3 AND COMPARATIVE EXAMPLE 3

A glass sheet having a thickness of 2 mm and the laminate sheet Y obtained in Example 2 were set in parallel to each other with a clearance of 2 cm, and the overall coefficient of transfer of heat through the glass sheet, the 2 cm air layer and the laminate sheet was measured. It was found to be 2.0 kcal/m².hr.deg. When the laminate sheet Z obtained in Comparative Example 1 was used instead of the laminate sheet Y, the overall coefficient of heat transfer was 3.3 kcal/m².hr.deg.

EXAMPLE 4

A prefabricated building with a size of 1.5×1.5×1.8 m was set in a large constant-temperature room at which the temperature was −10° C. and the wind speed was 3 m/sec.

One side of this building was composed of a window spanned with a glass plate having a thickness of 3 mm and the laminate sheet obtained in Example 2 whose transparent flexible layer faced the glass surface with the distance therebetween being adjusted to 40 mm. The other side of the building was filled with a heat insulating material of glass wool having a thickness of 150 mm.

The temperature of the inside of the building was maintained at 20° C. by using an electric stove. The surface temperature of the laminate sheet placed inside the building was found to be 13° C. On the other hand, when the laminate sheet obtained in Comparative Example 1 was set in the same way, its surface temperature was 9° C.

When a person went into the building having the sheet of Comparative Example 1 mounted there, and sat for a while, he strongly felt coldness radiating from the surface of the sheet.

A globe thermometer believed to correspond to the temperature which the body feels was set at a distance of 10 cm from the center of the sheet. It read 18° C. in the case of the sheet of Example 2, and 17° C. in the case of the sheet of Comparative Example 1.

EXAMPLE 5

The same prefabricated building as used in Example 4 was placed in the same constant-temperature room as used in Example 4 under the same conditions. One side of this building was composed of a glass sheet having a thickness of 3 mm and the laminate sheet obtained in Example 1 which were spaced from each other by a distance of about 40 mm. The transparent flexible layer of the laminate sheet was caused to face the inside of the building. The temperature of the inside of the building was adjusted to 20° C.

A radiation sensor of an "HMF heat transfer meter" (a product of Showa Denko Kabushiki Kaisha) was set parallel to the laminate sheet at a distance of 10 cm from it. As a result, radiant heat of 4 kcal/m².hr was seen to flow from the sensor toward the laminate sheet.

On the other hand, when the laminate sheet obtained in Comparative Example 1 was set in the same way, radiant heat of 66 kcal/m².hr was seen to flow from the sensor toward the laminate sheet.

This experimental fact shows that by using the laminate sheet of this invention, the heat which is lost by radiation from the body surface of a person sitting beside the window decreases to less than one-tenth. It is seen that the laminate sheet structure of this invention is very effective for preventing chills which a person may observe when sitting beside the window.

What we claim is:

1. A laminated multilayer sheet structure comprising (A) an opaque flexible sheet layer, and (B) a flexible layer laminated on the surface of layer (A) and composed of a transparent thermic ray reflecting layer ($B_1$) bonded to a transparent synthetic resin layer ($B_2$), said layer ($B_1$) being a transparent thermic ray reflecting layer composed of (i) a layer of a metal having a thickness of about 50 to about 600 Å, said metal being selected from the group consisting of gold, silver, copper, aluminum and a mixture or alloy of at least two of said metals, and (ii) a high refractive substance layer having a thickness of about 50 to about 600 Å, of an oxide of titanium derived from a layer of an organic titanium compound of the formula $$Ti_lO_mR_n$$

where R is alkyl of 1–20 carbon atoms,
    $l = 1-30$, $m = 4 + 3(l-1)$, and $n = 4 + 2(l-1)$, and containing the organic residual moiety of the organic titanium compound, the amount of said organic residual moiety being 0.1 to 30% by weight based on the weight of the high refractive substance layer; or said layer ($B_1$) being a transparent semiconductive layer having a thickness of about 500 to about 5,000 Å and being composed of a compound selected from the group consisting of indium oxide, tin oxide, cadmium oxide, antimony oxide, copper iodide, and a mixture of at least two of said compounds.

2. The sheet structure of claim 1 wherein the layer ($B_2$) is in contact with the layer (A).

3. The sheet structure of claim 1 wherein the layer ($B_1$) is the transparent semiconductive layer.

4. The sheet structure of claim 1 wherein the layer ($B_1$) consists of the layer of the metal and the high refractive substance layer.

5. The sheet structure of claim 1 wherein the layer (A) is a layer selected from the group consisting of paper, a woven cloth, a knitted cloth, and a non-woven cloth.

6. The use of the sheet structure of claim 1 as an interior material for covering floors, walls, ceilings, partitions, or furniture.

7. The sheet structure of claim 1 wherein the layer ($B_2$) has a thickness of about 2 μm to about 3 mm.

8. The sheet structure of claim 1, which further comprises a transparent protective layer ($B_3$) having a thickness of not more than 5μ coated or laminated onto the transparent thermic ray reflecting layer ($B_1$).

9. A method for heat-insulating a room, which comprises applying to the surface of a floor, wall, ceiling or partition, in the room, a laminated multilayer sheet structure comprising (A) an opaque flexible sheet layer, and (B) a flexible layer laminated on the surface of layer (A) and composed of a transparent thermic ray reflecting layer ($B_1$) bonded to a transparent synthetic resin layer ($B_2$), said layer ($B_1$) being a transparent thermic ray reflecting layer composed of (i) a layer of a metal having a thickness of about 50 to about 600 Å, said metal being selected from the group consisting of gold, silver, copper, aluminum and a mixture or alloy of at least two of said metals, and (ii) a high refractive substance layer having a thickness of about 50 to about 600 Å, of an oxide of titanium derived from a layer of an organic titanium compound of the formula $$Ti_lO_mR_n$$

where R is alkyl of 1–20 carbon atoms,
    $l = 1-30$, $m = 4 + 3(l - 1)$, and $n = 4 + 2(l - 1)$, and containing the organic residual moiety of the organic titanium compound, the amount of said organic residual moiety being 0.1 to 30% by weight based on the weight of the high refractive substance layer; or said layer ($B_1$) being a transparent semiconductive layer having a thickness of about 500 to about 5,000 Å and being composed of a compound selected from the group consisting of indium oxide, tin oxide, cadmium oxide, antimony oxide, copper iodide, and a mixture of at least two of said compounds, said applying being carried out in such a manner that the layer (A) side of the sheet structure is in contact with said surface.

10. The method of claim 9 wherein, in the sheet structure, the layer ($B_2$) is in contact with the layer (A).

11. The method of claim 9 wherein the sheet structure further comprises a transparent protective layer ($B_3$) having a thickness of not more than 5μ coated or laminated onto the transparent thermic ray reflecting layer ($B_1$).

12. The method of claim 9 wherein the layer ($B_2$) has a thickness of about 2 μm to about 3 mm.

* * * * *